Sept. 17, 1963 H. KOELMANS ETAL 3,104,229
PHOTOCONDUCTOR DEVICE
Filed Nov. 16, 1960
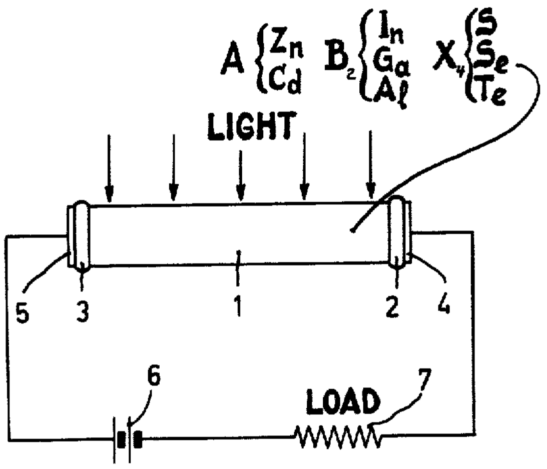
INVENTOR
HEIN KOELMANS
HERMANN G. GRIMMEISS
BY
AGENT 3,104,229

PHOTOCONDUCTOR DEVICE

Hein Koelmans, Eindhoven, Netherlands, and Hermann Georg Grimmeiss, Aachen, Germany, assignors to North American Philips Company, Inc., New York, N.Y., a corporation of Delaware Filed Nov. 16, 1960, Ser. No. 69,752
Claims priority, application Netherlands Nov. 28, 1959
7 Claims. (Cl. 252—501)

This invention relates to a semi-conductor device, in particular a photosensitive device, having an activated semi-conductive and photo-conductive member respectively, and to methods of making same. Such activated semi-conductor members are used inter alia in photo-electric cells or in the photo-sensitive or electro-luminescent part of so-called electro-optical systems which comprise a combination of a photo-sensitive element and an electroluminescent element, for example a solid-state radiation intensifier, and the like, or also in electroluminescent elements, in which the activation may also determine the intensity and the spectral distribution of the photosensitivity and of the radiation emitted respectively.

Many materials which show photosensitive and/or electroluminescent properties are known, such for example as the sulphides, selenides or tellurides of, for example, bivalent or trivalent elements, or also elementary semi-conductors, such for example as selenium. Among the large group of photosensitive materials known per se, the semi-conductor compounds cadmium sulphide and cadmium selenide are to be preferred because they may have a particularly high photosensitivity and high dark resistance when activated suitably. In order to obtain a high photosensitivity in these compounds, it is necessary, however, to incorporate in these compounds a rather large quantity of activators, such for example as silver or copper, in a concentration of, for example, $10^{-4}$–$10^{-3}$ activators per molecule of CdS. However, this is not possible as such; therefore, a corresponding quantity of so-called co-activator must be added simultaneously to the cadmium sulphide, for which are used in general trivalent metals, such for example as gallium or also the halogens. However, this co-activation is an extremely critical process since the quantities of activator and co-activator should be matched to each other very accurately. In the case of an excess of activator, this activator is not taken up in the right manner or incompletely in the crystal lattice and may cause there separation at the surface and formation of so-called killer centers which drastically decrease the photosensitivity, while in the case of an excess of co-activator the dark resistance deteriorates strongly. Since these compounds are hard to melt owing to their high melting temperature and decomposition by the volatility of the components sulphur and selenium, it is practically not possible, unless under conditions hard to maintain, to perform the incorporation of activators via the melt, for example simultaneously with the crystallization process for the formation of crystals. Analogous activation problems may present themselves in electroluminescent members, in which it may also be desirable that the relative member has a high resistance when activated effectively. A further drawback of cadmium sulphide and a photosensitive substance is that it is rather slow and more in particular has a decay time of the order of magnitude of approximately 0.1 sec.

One of the objects of the present invention is to provide a group of materials with a suitable activation in which the above drawbacks do not occur or at least to a far smaller extent.

The invention is based on the surprising observation that in the semi-conductor compounds of the composition $AB_2X_4$, in which A represents one or more of the elements cadmium and zinc, B one or more of the elements In, Ga, Al, and X one or more of the elements S, Se and Te, the activation process can be carried out in an extremely simple manner when using certain activators, in which, thanks to a process of automatic co-activation by the compound itself, the co-activator may even be omitted, if desired. In addition, it has appeared that these compounds when activated suitably are also particularly suitable in other respects, in particular as photosensitive material.

In a semi-conductor device, in particular a photosensitive device having an activated semi-conductor and photosensitive member respectively, the semi-conductor member according to the invention comprises substantially a compound of the composition $AB_2X_4$, in which A represents one or more of the elements Zn and Cd, B one or more of the elements In, Ga and Al, and X one or more of the elements S, Se or Te, which contains as activator at least one of the monovalent metals from the group Au, Ag, Cu.

Neutral elements or other activators may simultaneously be added to the semi-conductor member. It has appeared, however, that already particularly favourable results as far as the photosensitivity is concerned are obtained when the semi-conductor member comprises as activator only one or more of the monovalent metals Au, Ag and Cu. It has appeared possible in a simple and reproducible manner without the use of a co-activator to incorporate a satisfactorily operating atomic concentration of approximately $10^{-5}$ to approximately $10^{-2}$ of these activators. The atomic concentration of said activators preferably amounts to from $10^{-4}$ to $5\times10^{-3}$. The thus activated semi-conductor members show a high photosensitivity with a high dark resistance which closely approaches the photosensitivity of cadmium sulphide, in particular in the field of high radiation intensity. It is of particular advantage that the activation is a far less critical process than with compounds such as cadmium sulphide, and that the activation of these compounds, also with the use of a co-activator, is possible in an effective, simple and reproducible manner. This is probably possible owing to an automatic co-activation by the compound itself which may be considered a ternary compound built up from the binary compounds AX and $B_2X_3$ in equimolecular ratio. Neither in the case of an excess of AX, nor in the case of an excess of $B_2X_3$ did any deviation from the equimolecular ratio turn out to cause a decrease of the dark resistance or a deterioration of the photosensitivity which also benefits the reproducibility. The automatic co-activation may be explained as follows without restricting the invention to same: The said activator elements are probably incorporated monovalent in bivalent A-positions in the lattice and there compensated for by an automatic incorporation of an equal quantity of trivalent B-atoms, so that consequently each time two positions are occupied by a monovalent activator and a trivalent B. Any resulting surplus of A, e.g., cadmium which, in view of the low concentration of activators, will also be low, could remain in the lattice as a non-disturbing separate CdS-phase.

An additional important advantage of most of the compounds $AB_2X_4$ is that their melting temperature is relatively low and the decomposition pressure is not yet too large so that hey can be melted in a simple manner in the commonly used quartz tubes. As a result of this, the activation can take place in a simple manner via the melt and said activtion may be combined with the crystllization from the melt for the formation of crystals. For that purpose, purification methods and activation methods commonly used in the semiconductor technology may be applied, in which, for example, a homogeneous distribution of the activator is effected by means of, for example, zone melting. As is usual with this type of compounds, the temperature treatments or melt treatments are carried out in an inert atmosphere or preferably in an atmosphere containing the volatile component of the compound so as to check decomposition. According to a further aspect of the invention, the activated semiconductor body may consequently consist of a crystallization product obtained from the melt. The said advantage holds in particular with respect to those compounds $AB_2X_4$, in which B is formed by indium of gallium, such as for example $CdIn_2Te_4$, $CdIn_2S_4$, $ZnGa_2Se_4$, $ZnIn_2Se_4$. In connection with the satisfactory value of their band distance are particularly suitable those compounds in which B is formed by indium and X by sulphur or selenium, such, for example, as $ZnIn_2S_4$ and $CdIn_2S_4$. Particularly satisfactory results in every respect were already obtained with $CdIn_2S_4$. With this latter compound activated in the manner according to the invention, a low decay time, namely of the order of a millisecond, was obtained without more as a further advantage, which is more rapid by a factor 100 than in the case of cadmium sulphide. As far as the activators are concerned, gold and copper are preferred, since the best results are obtained with these substances.

In order that the invention may be readily carried into effect, it will now be described in greater detail, by way of examples and a drawing.

FIGURE 1 of the drawing shows schematically a photosensitive device according to the invention.

*Example I*

The compound $CdIn_2S_4$ was manufactured by mixing equimolecular quantities of CdS and $In_2S_3$ in powder form and heating in a $H_2S$-stream of atmospheric pressure at 900° C. for two hours. 1 cc. of a $10^{-2}$ N $Cu(NO_3)_2$-solution was added to 4.70 g. of the thus obtained $CdIn_2S_4$-powder. After mixing and drying at 70° C., the powder is heated in a quartz tube at 900° C., for approximately 60 minutes, while pure $H_2S$ of atmospheric pressure is passed through the quartz tube. In this latter heating step the $Cu(NO_3)_2$ is converted into $Cu_2S$, the $NO_2$ and $H_2O$ vapours arising from this reaction being carried away by the $H_2S$-stream. Then 100 mg. of sulphur are added to the powder and the whole is heated at 1150° C. for approximately 60 minutes in an evacuated sealed quartz tube of approximately 10 cc. capacity. The quantity of sulphur added effects a sulphur pressure of approximately 5 atm., and serves to check decomposition. Under the said circumstances, the preparation is in a melted state. After cooling, an activated crystallization product is obtained with a concentration of approximately $10^{-3}$ Cu-atoms per molecule of $CdIn_2S_4$. From this a strip-shaped member 11 (see figure) having a cross sectional area of approximately 2×0.5 mm.² is manufactured by sawing and after grinding and polishing it is attached at the ends by means of indium-amalgam 2 and 3 to two copper electrodes 4 and 5, so that the electrode distance amounts to approximately 4 mm. On measurement, the dark resistance between the electrodes turned out to be approximately 50M ohms. On irradiation with white light with an illumination intensity of approximately $10^4$ lux, the resistance was only 500 ohms. Non-activated members of this compound, which otherwise were manufactured and provided with contacts in the same manner, turned out to have a dark resistance of substantially the same value, but the resistance with the same illumination with approximately $10^4$ lux was considerably higher and amounted to approximately $10^5$ ohms. The photosensitive member 1 with its electrodes 4 and 5 attached thereto may be used for instance in a circuit as shown further in the figure. A battery 6 and a load 7, which may for instance be a relay, are connected in series between the electrodes 4 and 5, while the light is directed on the member 1 between the electrodes. The member 1 may in general consist of any of the compounds $AB_2X_4$ as described above, and dotated with any of the elements Au, Ag and Cu.

For comparison, also members with other copper concentrations were manufactured and measured in otherwise the same manner. The dark resistance turned out to be each time of practically the same value, namely approximately 50M ohms, while the resistance when illuminated with $10^4$ lux for the concentrations $10^{-2}$, $5\times10^{-3}$, $2\times10^{-3}$, $5\times10^{-4}$ and $10^{-4}$ amounted to $3\times10^4$ ohms, 9000 ohms, 500 ohms, 1000 ohms and 5000 ohms respectively.

When measuring the spectral sensitivity of these members, the maximum sensitivity turned out to be approximately 6000 A., while a good sensitivity occurred in the range of from 5500 A. to 7000 A.

It is noted that a superlinear dependence of the photocurrent with the illumination intensity was found in those cases in which the members are obtained from the crystallization product without further treatment. This superlinear behaviour may in many cases be removed substantially by grinding the members before providing them with contacts. In these cases, a substantially linear behaviour was found also in the case of a far lower illumination intensity. This disappearance of the superlinear dependence is probably linked up with the presence of an inhomogeneous distribution of centres in the member formed during the rather rapidly occurring crystallization from the melt.

*Example II*

Bodies from $CdIn_2S_4$, manufactured and treated in the same manner as described in Example I, with only this difference that silver was added as an activator, namely 1 cc. of a $10^{-2}$ N $AgNO_3$-solution, showed a dark resistance of substantially the same value as mentioned above, while the resistance, when illuminated with $10^4$ lux, was approximately $10^4$ ohms.

*Example III*

Bodies from $CdIn_2S_4$, manufactured and treated in the same manner as described in Example I, with only this difference that as activator gold was added, namely 1 cc. of a $10^{-2}$ N $AuCl_3$-solution, appeared to have a dark resistance of the same value as described above, while the resistance, when illuminated with $10^4$ lux, only amounted to 300 ohms.

*Example IV*

Equimolecular quantities of ZnS and $In_2S_3$ were heated at 900° C. in an $H_2S$-stream of atmospheric pressure for approximately two hours so as to form the compound $ZnIn_2S_4$. 1 cc. of $10^{-2}$ $Cu(NO_3)_2$-solution was added to 4.2 g. of the thus obtained $ZnIn_2S_4$-powder. After mixing and drying at 70° C., the powder is heated in a quartz tube at 900° C. for approximately sixty minutes in a pure $H_2S$-stream of atmospheric pressure. Then 100 mg. of sulphur are added and the whole is heated at 1200° C. for approximately sixty minutes in an evacuated sealed quartz tube of approximately 10 cc. capacity. The preparation is then in the melted state. After cooling, a crystallization product is obtained containing approximately $10^{-3}$ Cu per mol $ZnIn_2S_4$. From this, bodies are manufactured and provided with contacts in the same manner as described in Example I. The dark resistance turned out to be approximately 100M ohms, while, when illuminating with white light and at an intensity of approximately $10^4$ lux, the resistance amounted to only 1000 ohms.

*Example V*

The compound $ZnGa_2S_4$ was manufactured by heating equimolecular quantities of ZnS and $Ga_2S_3$ in powder form at 1000° C. for approximately two hours in an $H_2S$-stream of atmospheric pressure. 10 cc. of a $10^{-2}$ N $Mn(NO_3)_2$-solution and 1 cc. of a $10^{-2}$ N $Cu(NO_3)_2$-solution were added to 3.3 g. of this powder. After mixing and drying at 70° C., the powder is heated at 1150°

C., which is below the melting point of $ZnGa_2S_4$, for two hours in a quartz tube through which $H_2S$ of atmospheric pressure is passed. The thus obtained powder is washed with a $Cu(NO_3)_2$-solution in order to obtain small amounts of non-incorporated copper-sulphide at the surface of $ZnGa_2S_4$-grains. After drying, the powder is provided between two electrodes, one of which is transparent and consists, for example, of glass which has been made conductive, and the other of copper. When setting up a direct or alternating voltage, a red electro-luminescence occurs, the maximum of which lies at approximately 6500 A. The emission originated from the manganese centres, while the presence of the activator copper turned out to intensify the emission.

What is claimed is:

1. A method of making a photosensitive body constituted substantially of the activated compound $AB_2X_4$, where A is selected from the group consisting of zinc and cadmium, B is selected from the group consisting of indium, gallium and aluminum, and X is selected from the group consisting of sulphur, selenium and tellurium, comprising forming a melt of the said compound and a monovalent activator selected from the group consisting of gold, silver and copper, crystallizing from the melt the said activated compound, and forming a coherent body of crystals of the said activated compound.

2. A method of making a photosensitive body constituted substantially of the activated compound $AB_2X_4$, where A is selected from the group consisting of zinc and cadmium, B is selected from the group consisting of indium, gallium and aluminum, and X is selected from the group consisting of sulphur, selenium and tellurium, comprising forming a melt of the said compound and about $10^{-5}$ to $10^{-2}$ atoms per mole of the compound of a monovalent activator selected from the group consisting of gold, silver and copper crystallizing from the melt the said activated compound, and forming a body of the said activated compound.

3. The method of claim 2 wherein the compound is $CdIn_2S_4$.

4. A semiconductor device comprising a photosensitive body consisting essentially of the composition $AB_2X_4$, wherein A is at least one element selected from the group consisting of zinc and cadmium, B is at least one element selected from the group consisting of indium, gallium and aluminum, and X is at least one element selected from the group consisting of sulphur, selenium and tellurium, said composition including as an essential activator between approximately $10^{-5}$ and $10^{-2}$ atoms of at least one element selected from the group consisting of gold, silver and copper per molecule of the composition, and spaced electrode connections to said body.

5. A photosensitive semiconductor device comprising a crystallization product having a composition consisting essentially of $AB_2X_4$, wherein A is at least one element selected from the group consisting of zinc and cadmium, B is at least one element selected from the group consisting of indium, gallium and aluminum, and X is at least one element selected from the group consisting of sulphur, selenium and tellurium, and activated substantially only by about $10^{-5}$ to $10^{-2}$ atoms of an element selected from the group consisting of gold, silver and copper per molecule of the composition, and electrode connections to said body.

6. A semiconductor device comprising a crystalline body consisting essentially of the composition $CdIn_2S_4$ activated substantially only by about $10^{-4}$ to $10^{-3}$ atoms per molecule of $CdIn_2S_4$ of gold.

7. A semiconductor device comprising a crystalline body consisting essentially of the composition $CdIn_2S_4$ activated substantially only by about $10^{-4}$ to $10^{-3}$ atoms per molecule of $CdIn_2S_4$ of copper.

References Cited in the file of this patent

UNITED STATES PATENTS

| | | |
|---|---|---|
| 2,916,678 | Bube et al. | Dec. 8, 1959 |
| 2,994,621 | Hugle et al. | Aug. 1, 1961 |

OTHER REFERENCES

Kolomiets et al.: Chemical Abstracts, vol. 44, 1950, page 4327*e*; abstract of article by Kolomiets et al., entitled "Photoelectric Properties of Indium Sulfide and Selenide"; printed in Zhur. Techn. Fiz., vol. 17, pp. 987–92 (1947).

Mooser et al.: The Chemical Bond in Semiconductors, Journal of Eelectronics, vol. 1, May 1956, pp. 629–645.

UNITED STATES PATENT OFFICE

CERTIFICATE OF CORRECTION

Patent No. 3,104,229

September 17, 1963

Hein Koelmans et al.

It is hereby certified that error appears in the above numbered patent requiring correction and that the said Letters Patent should read as corrected below.

Column 2, line 57, after "two" insert -- A- --; line 66, for "hey" read -- they --; line 69, for "activtion" read -- activation --.

Signed and sealed this 14th day of April 1964.

(SEAL)
Attest:
ERNEST W. SWIDER

Attesting Officer

EDWARD J. BRENNER

Commissioner of Patents